United States Patent
Nachman et al.

(10) Patent No.: US 9,872,142 B2
(45) Date of Patent: Jan. 16, 2018

(54) CONTEXT-AWARE COLLABORATIVE USER TRACKING

(71) Applicant: Intel Corporation, Santa Clara, CA (US)

(72) Inventors: Lama Nachman, Santa Clara, CA (US); Horst W. Haussecker, Palo Alto, CA (US); Jim S. Baca, Corrales, NM (US); Burges Karkaria, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/106,764

(22) PCT Filed: Dec. 19, 2013

(86) PCT No.: PCT/US2013/076479
§ 371 (c)(1),
(2) Date: Jun. 20, 2016

(87) PCT Pub. No.: WO2015/094270
PCT Pub. Date: Jun. 25, 2015

(65) Prior Publication Data
US 2016/0337795 A1 Nov. 17, 2016

(51) Int. Cl.
H04W 24/00 (2009.01)
H04W 4/02 (2009.01)
H04W 4/20 (2009.01)

(52) U.S. Cl.
CPC ........... *H04W 4/023* (2013.01); *H04W 4/028* (2013.01); *H04W 4/206* (2013.01)

(58) Field of Classification Search
CPC ...... H04W 4/023; H04W 4/206; H04W 4/028
(Continued)

(56) References Cited

U.S. PATENT DOCUMENTS 7,203,487 B2 * 4/2007 Comp .................. H04W 8/005
455/226.2
2010/0323659 A1 12/2010 Wehling
(Continued)

FOREIGN PATENT DOCUMENTS

WO WO2015094270 A1 6/2015

OTHER PUBLICATIONS

Notice of Preliminary Rejection dated May 12, 2017 for Korean Patent Application No. 2016-7013068, 4 pages.
(Continued)

*Primary Examiner* — Amancio Gonzalez
(74) *Attorney, Agent, or Firm* — Schwabe, Williamson & Wyatt, P.C.

(57) ABSTRACT

Technologies are presented that provide collaborative context-based user tracking and communications. A method of tracking communication options may include receiving, from one or more user devices of a user, user proximity information that indicates whether the user is in proximity of the one or more user devices; receiving, from the user devices, tracking loss warnings that indicate that loss of capabilities to track the user by respective user devices may be imminent; receiving, from the user devices, secondary device proximity information that indicates whether the user device is in proximity of one or more secondary devices; and receiving, from the secondary devices, additional user proximity information that indicates whether the user is in proximity of the one or more secondary devices. The method may further include dynamically determining from the received information which of the user devices and secondary devices are able to provide communications to the user.

20 Claims, 10 Drawing Sheets

(58) Field of Classification Search
USPC .................................................. 455/456.1
See application file for complete search history.

(56) References Cited

U.S. PATENT DOCUMENTS

| | | |
|---|---|---|
| 2012/0136942 A1 | 5/2012 | Amindon et al. |
| 2012/0207294 A1 | 8/2012 | Katpelly et al. |
| 2013/0297704 A1 | 11/2013 | ALberth, Jr. et al. |
| 2015/0019342 A1* | 1/2015 | Gupta ................ G06Q 30/0269 |
| | | 705/14.66 |

OTHER PUBLICATIONS

Extended European Search Report dated May 10, 2017 for European Patent Application No. 13899942.0, 9 pages.

* cited by examiner

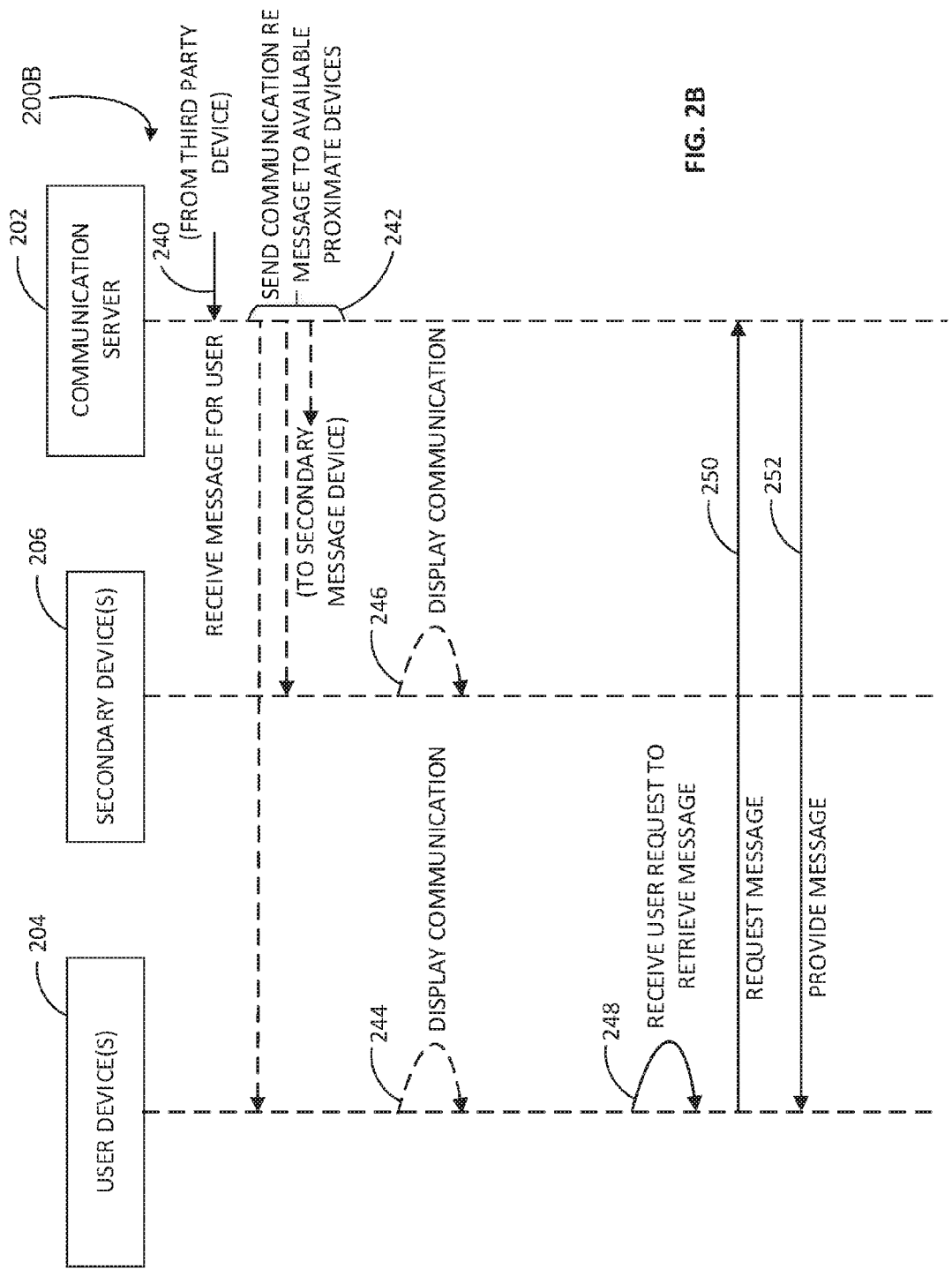

CONTEXT-AWARE COLLABORATIVE USER TRACKING

BACKGROUND

Currently, when a person (e.g., a "caller") tries to reach an intended recipient, the "caller" may try to, for example, call, text, or email the intended recipient via one or more telephone numbers, email addresses, etc. of the intended recipient. Presently, there are services that attempt to route the "caller", or a message from the "caller", from one communication mechanism to another in an attempt to reach the intended recipient through one or more personal communication devices of the intended recipient. However, these services fail when the personal communication device(s) of the intended recipient are, for example, turned off, lacking charge, muted, buried in a bag, or forgotten or lost. Alternate means of reaching another person are needed.

BRIEF DESCRIPTION OF THE DRAWINGS/FIGURES

FIGS. 2A-2C are sequence diagrams depicting device interaction as described herein, according to embodiments.

Figure 1:
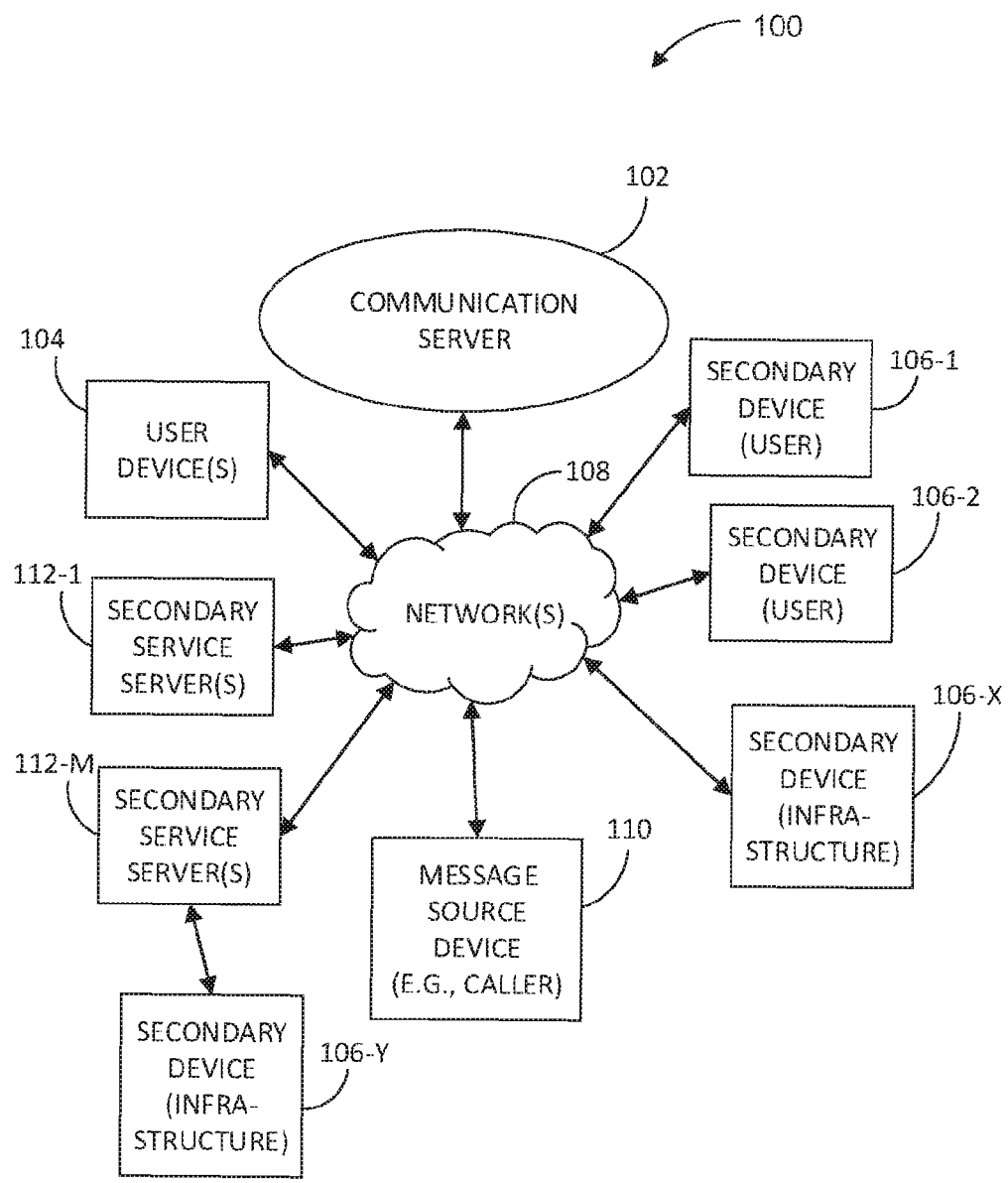
FIG. 1 is a block diagram of an example system described herein, according to an embodiment.

In the drawings, the leftmost digit(s) of a reference number may identify the drawing in which the reference number first appears.

DETAILED DESCRIPTION

Disclosed herein are technologies that solve the technical problem of providing communications to a user even when the user's own personal computing and/or communication devices are unavailable or not in proximity of the user. With the technologies disclosed herein, the described system may allow for collaborative and context-based user tracking among various recognized devices of a communication service in order to improve a user's reachability. With millions of electronic devices throughout the world (both personal and infrastructural) capable of tracking and communications, the technologies described herein may provide various alternate means of reaching another person, even when that person's own personal communication devices are unavailable or unreachable.

Embodiments are now described with reference to the figures, where like reference numbers may indicate identical or functionally similar elements. While specific configurations and arrangements are discussed, it should be understood that this is done for illustrative purposes only. A person of ordinary skill in the relevant art will recognize that other configurations and arrangements can be used without departing from the spirit and scope of the description. It will be apparent to a person of ordinary skill in the relevant art that this may also be employed in a variety of other systems and applications other than what is described herein.

FIG. 1 is a block diagram of an example system 100, according to an embodiment. System 100 may include a communication server 102 of a communication service that may be in communication with various user device(s) 104 and secondary device(s) 106 via one or more networks 108. A message or communication received by communication server 102 for a user of the communication service may be received via network(s) 108 from a message source device 110, for example. Secondary device(s) 106 may include one or more user devices 106-1/106-2/etc. of users of the communication service and/or one or more infrastructure devices 106-X/106-Y/etc. including such devices as, for example, cameras, badge readers, ticket readers, loyalty card readers, debit or credit card readers, display devices, and/or other devices and/or sensors recognized by the communication service that may be in communication with communication server 102 directly via network(s) 108 or indirectly through one or more secondary service server(s) 112. Secondary service server(s) 112 may be servers maintained by one or more secondary services recognized by the communication service that may manage infrastructural sensors and devices, for example. Secondary services may include, for example, public transportation stations or departments of transportation, businesses, stores, restaurants, banks, parks, amusement parks, entertainment complexes, sporting complexes, schools, universities, etc. One of ordinary skill in the art would appreciate that the concepts described herein may extend to other types of secondary services. Various elements of system 100 will be described in more detail below.

Communication server 102 may be implemented in software and/or hardware executed or controlled by a controller of communication server 102. While only one communication server is illustrated for clarity and ease of discussion, it should be appreciated that communication server 102 may include multiple distributed server computers for redundancy, task sharing, and/or load sharing, for example, which may be useful for embodiments that include many networked devices. Communication server 102 may include and/or have access to one or more data stores (not shown). A data store of communication server 102 may store, for example, information that may be collected and maintained regarding the availability of user devices and/or secondary devices that may be in proximity of the user and/or user devices, infrastructure device information, message information, historical data, communication logs, user information and/or profiles, etc.

User device(s) 104 may be used by a user to consume various types of media and applications (e.g., television programs, photos, videos, music, games, websites, word processing, communications (email, messaging, texting, etc.), etc.). User device(s) 104 may be personal computing devices that may include mobile and non-mobile devices. Mobile devices may include, but are not to be limited to, for example, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, wearable devices, mobile media playing devices, cameras, mobile gaming consoles, location detection and navigation devices, etc. Non-mobile devices may include, but are not to be limited to, for example, personal computers (PCs), televisions, smart televisions, data communication devices, media playing devices, gaming consoles, monitors, wall panels, etc. User device(s) 104 may include tuners with speakers that may or may not also include a visual display. User device(s) 104 may include set-top boxes (e.g., cable set-top box, digital video recorders (DVRs), gaming consoles, etc.) that may be connected to, and configured to control the presentation of media on, a display or presentation device such as a television, a monitor, a wall panel, personal computer, media playing device, etc. User device(s) 104 may include computing devices and/or sensors (e.g., computing devices, location detection and navigation devices, cameras, microphones, voice sensors, etc.) in or on a personal transportation vehicle, such as a car, truck, van, motorcycle, bicycle, etc.

User device(s) 104 may include controllers and other components that execute software and/or control hardware in order to execute local programs or consume services provided by external service providers over a network. For example, user device(s) 104 may include one or more software clients or applications for utilizing or accessing applications, communications, web-based services, games, videos, photos, music, etc. User device(s) 104 may include one or more software clients or applications for utilizing or accessing cable-based services such as cable television, on-demand videos, etc. User device(s) 104 may also, or instead, include a web interface running in a browser from which the user device can access such services. User device(s) 104 may include storage devices (not shown in FIG. 1) to store logic and data associated with the programs and services used by the user device(s) 104. User device(s) 104 may include location-aware capabilities or devices, such as global positioning system (GPS) devices or devices with similar capabilities. For network communication, user device(s) 104 may include components that facilitate communication through wired or wireless technologies such as Ethernet, Wi-Fi, Bluetooth®, cable, etc.

Secondary device(s) 106 may include user devices of other users of the communication service and/or infrastructural devices that are recognized by the communication service but not associated with any particular user of the communication service. Secondary user devices (e.g., devices 106-1/106-2) may be similar to user device(s) 104 described above, and are differentiated herein simply for ease of description of various aspects of the communication service. Secondary infrastructure devices (e.g., devices 106-X/106-Y) may include sensors and/or devices that may exist in the environment and may be capable of detecting and/or presenting communications to users of the communication system. Secondary infrastructure devices 106-X/106-Y may include, for example, cameras, badge readers, ticket readers, loyalty card readers, debit or credit card readers, display devices, and/or other devices and/or sensors. Secondary infrastructure devices 106-X/106-Y may be a part of the infrastructure managed and/or maintained by secondary services such as, for example, public transportation stations (e.g., train stations, bus stations, subway stations, etc.) or departments of transportation, businesses, stores, restaurants, banks, parks, amusement parks, entertainment complexes, sporting complexes, schools, universities, etc. Communications between communication server 102 and secondary infrastructure devices 106-X/106-Y may occur directly or via one or more secondary service servers 112 that are in communication with one or more secondary infrastructure devices 106-X/106-Y. Secondary infrastructure devices 106-X/106-Y may include controllers and other components that execute software and/or control hardware in order to execute local programs or functions such as, for example, detecting identifying aspects of persons in proximity, providing communications to persons, and/or providing signals that may be used to determine proximity to the secondary infrastructure devices 106-X/106-Y. For example, a particular secondary infrastructure device 106, such as, for example, a public transportation smart-card reader, may recognize that a particular passenger's card was swiped. If the passenger is a user of the communication service, this information may be provided to the communication server (e.g., directly or via a secondary service server 112 that manages the secondary infrastructure device 106), which may indicate to the communication server that a communication may be able to be provided to the user via the smart card reader or another secondary infrastructure device 106 in the vicinity of that smart-card reader (e.g., an electronic message board of the train station, a message display on the train, etc.). In embodiments, the passenger may need to set up preferences, through a secondary service server 112, for example, that would allow the secondary service server 112 to share information regarding the passenger with the communication server 102.

Network(s) 108 may be any wired or wireless network, such as a Wide Area Network (WAN), a Local Area Network (LAN), and/or the like. In an embodiment, network(s) 108 may include a home network or LAN. In an embodiment, network(s) 108 may include a distributed public network, such as the Internet. Communication server 102, user device(s) 104, secondary device(s) 106, secondary service server(s) 112, and any message source device(s) 110 may be connected to the network(s) 108 via wired or wireless connections (using, e.g., Bluetooth® technology, IEEE 802.15.4 technology, Wi-Fi technology, etc.). In embodiments, multi-tier networks with short range radio and a Wi-Fi mesh overlay may be used.

For ease of understanding the description of a communication system herein, it may be important to consider one or more assumptions. First, users of user device(s) 104 and secondary user devices 106-1/106-2/etc. may be assumed to be registered with the communication service, along with identification of their personal user devices 104/106-1/106-2. User and/or device registration may be accomplished via downloading and running an application on a personal device of a user, or by visiting a website of the communication service, for example. Second, it may be assumed that secondary infrastructure devices 106-X/106-Y (and/or at least their managing secondary service server(s) 112) are registered to cooperate with the communication service. Third, it may be assumed that one or more types of external communications (e.g., telephone calls or texts to one or more telephone numbers, emails to one or more email addresses, etc.) intended for a user by third parties are set to route through the communication service. Lastly, it may be assumed that users have set up preferences and/or conditions regarding how they are tracked, and how and/or when they receive communications through the communication service. User preferences and/or conditions may be set by, or for, the user during registration for the communication service and/or may be set or updated by, or for, a user already registered with the communication service via a user interface of a user device, for example. User preferences and/or conditions are discussed in more detail below.

User preferences regarding tracking of a user may include, for example, which, if any, of the user's personal user devices can be used for detecting and/or tracking the user; which, if any, types of secondary devices may be used for detecting and/or tracking the user; how user devices and/or secondary devices may detect and/or track the user (e.g., facial recognition, voice recognition (e.g., using Mel Frequency Cepstral Coefficient (MFCC) features and/or Gaussian Mixture Model (GMM) classification), device detection, etc.); whether and/or how the user's personal user devices may be used for detecting secondary devices; whether and/or how the user's personal user devices may report imminent loss of tracking of the user and in what situations; etc. User conditions regarding communications with the user may include, for example, which "callers" can reach the user through the service; what user and/or secondary devices can be used to reach the user; what level of urgency is required to reach the user; when is the user to be reached by the service (e.g., time of day, day of week, holiday status, user location conditions, specific time range blocks (e.g., user input on a calendar accessed by the communication server), etc.); what messages may be communicated on which user devices and/or secondary devices (e.g., an actual message from a third party, or a message to contact the service); what name(s) to use to indicate to a user that a communication is intended for them (e.g., the user's actual name or an alias to protect privacy) and when to use those name(s); etc. In an embodiment, specific callers and/or other specific users of secondary user devices may be specified when setting user preferences and/or conditions. This may be done, for example, by entering identification of the specific callers and/or specific users of secondary user devices via a user interface of a user device. In another example, this may be done by association through one or more social networks (e.g., Facebook® social network, LinkedIn® social network, etc.) through which the user may have predefined associations or relationships with other users of the communication system. In an embodiment, one or more preferences and/or conditions may be set by an entity other than a user (e.g., by an employer per a corporate policy).

Figure 2A:
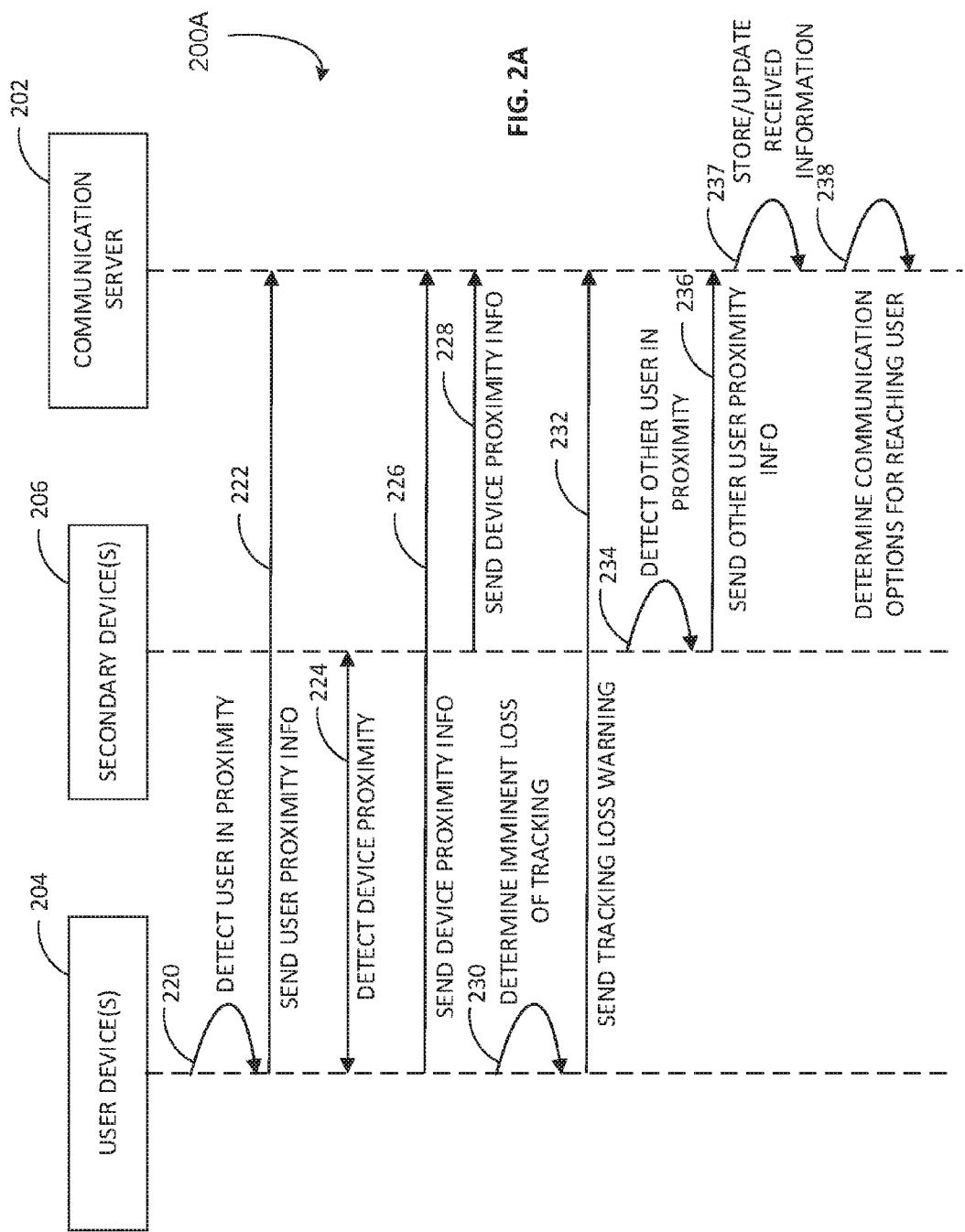
Figure 2C:
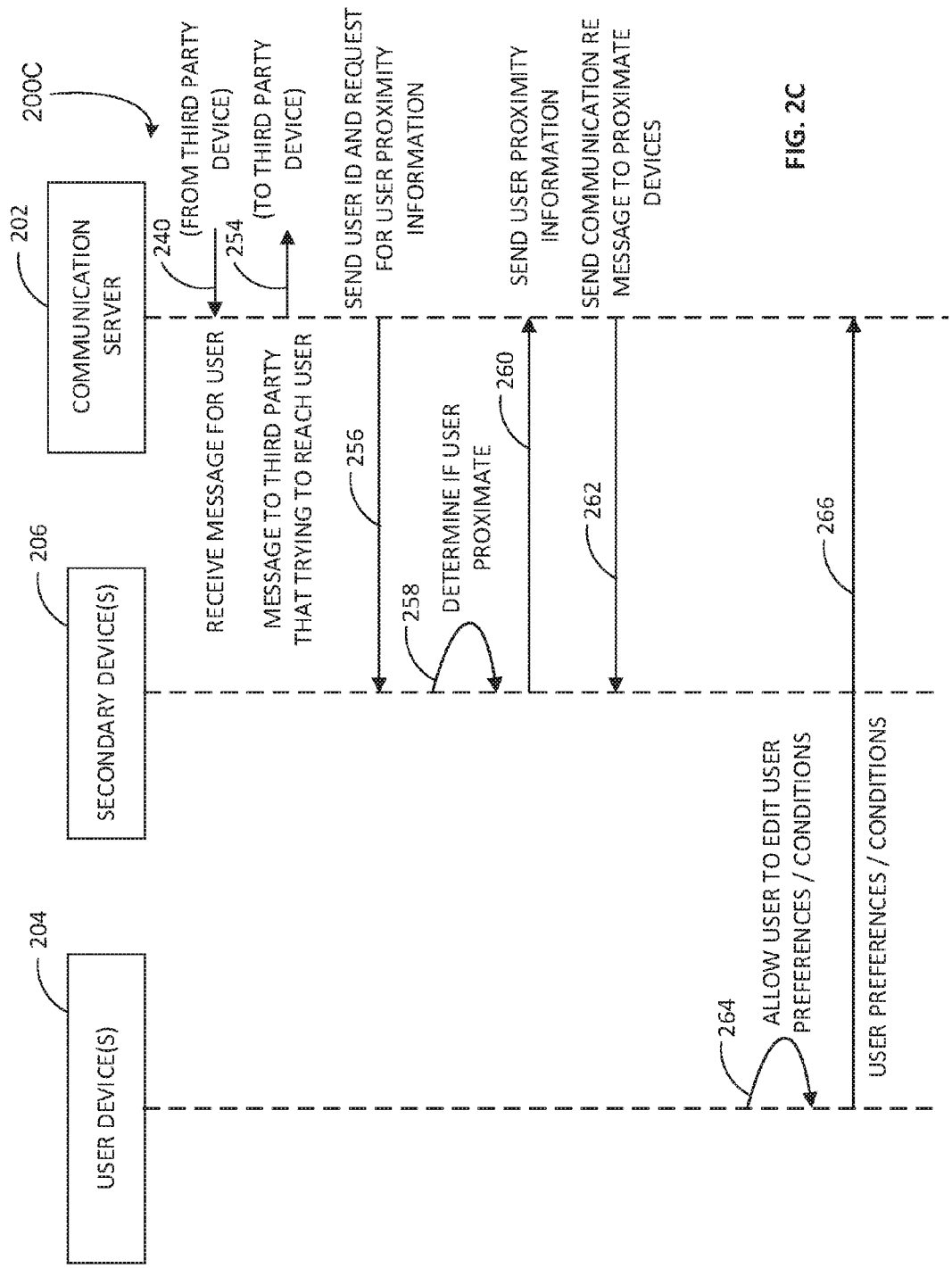

FIGS. 2A-2C are sequence diagrams depicting device interaction in a communication system such as communication system 100 of FIG. 1, according to embodiments. In embodiments described with reference to FIGS. 2A-2C, it should be noted that communications between devices may include an identifier of the sending device to identify the source of the communications.

FIG. 2A is a sequence diagram 200A illustrating user tracking, according to an embodiment. In FIG. 2A, it is assumed that user device(s) 204 and secondary device(s) 206, as well as any secondary service servers associated with one or more of secondary device(s) 206, have any required applications for participating in the communication system installed and running. In FIG. 2A, one or more user device(s) 204 of a user may detect that the user is in proximity or that that the user is no longer in proximity (220). A user may be detected by the user's own user devices in various ways. For example, a user device may detect that the user is in proximity by detecting that the user is using, or has recently used the user device. With the appropriate sensors (camera, microphone, accelerometer, etc.), a user device may detect that a user is in proximity by, for example, facial recognition, speaker identification, gait identification, etc. In addition, a user may proactively identify himself or herself by entering self-identification information via a user interface of the user device. For example, a user of a user device may be identified by having logged into the user device, logged into the communication service from the user device, etc., which is especially useful if the user device is shared by more than one person (e.g., a home computer shared by a family). Other ways of detecting a user of a user device by the user device may also be contemplated. Whether a user is in proximity may be based on a proximity threshold. The proximity threshold may be, for example, a predefined distance between a user and a user device, where the distance may be estimated or measured based on camera data, for example, or based on the distance between the user device and a wearable device (e.g., a smart watch) in communication with the user device. In another example, the proximity threshold may be based on a predefined loudness of a detected voice of the user. Other examples may also be contemplated. Referring back to FIG. 2A, user device(s) 204 may send user proximity information to communication server 202 (222).

User device(s) 204 and secondary device(s) 206 may detect each other in proximity (224). The determination of device proximity may be accomplished in various ways. For example, the user device may determine the proximity of a secondary device by a radio received signal strength indication (RSSI) when the devices are using communication and/or location technologies such as, for example, Wi-Fi, Bluetooth®, global position system (GPS) technologies, etc. In another example, audio proximity may be used, where two devices that "hear" a similar audio pattern may be determined as being co-located or in proximity of one another. Other ways of determining device proximity may also be contemplated. Similarly, in an embodiment, user device(s) 204 may detect other user device(s) 204 in proximity. For example, a wearable device may detect motion of a user, and when compared to the motion of a user device (e.g., a mobile phone) that may have been left on a desk, for example, it may be determined that the user is walking away from the mobile phone (e.g., via dead reckoning). User device(s) 204 may send device proximity information to communication server 202 (226). Similarly, secondary device(s) 206 may also send device proximity information to communication server 202 (228).

User device(s) 204 may determine that loss of tracking capability may be imminent (230). This may mean, for example, that the user device may no longer be able to track the user, or that the user device may no longer be able to report tracking information regarding the user to the communication server (e.g., due to network communication issues). The determination of loss of tracking capability may be accomplished in various ways. For example, the user device may determine that a charge on the device has dropped below a given charge. In another example, the user device may determine (e.g., via location determination, such as through a GPS service) that the user device is approaching an area known to have little to no network connectivity (e.g., a dead zone, a tunnel, etc.). In yet another example, the user device may determine that its network connectivity has weakened below a given strength. Other ways of determining loss of tracking capability may also be contemplated. User device(s) 204 may send one or more tracking loss warnings to communication server 202 (232).

Secondary device(s) 206 may detect the user (e.g., of user device(s) 204) in proximity (234), and may send associated user proximity information to communication server 202 (236). It should be noted that, in other embodiments, a secondary device 206 may detect a user of the communication service even if that user is not using or does not have any user devices 204 with him or her. This detection may be accomplished in a similar manner to that of the user device(s) 204 detecting their user (e.g., via facial recognition, speaker identification, etc.), or the user of a secondary device 206 may proactively identify one or more other users (e.g., including the user of user device(s) 204) by entering identifying information for the other user(s) via a user interface of the secondary device. In an embodiment, a secondary device 206 may detect the presence of another person and may send relevant data (e.g., photo, voice clip, etc.) to communication server 202 for the communication server to determine if the other person is a user of the communication service. In an embodiment, secondary device 206 may request at least a subset of user identifying information (e.g., profile photo or facial data, profile voice data, etc.) from the communication server for the secondary device to determine if the other person is a user of the communication service. In embodiments, to protect user privacy, user model data (as opposed to user photo or voice data) may be requested and/or received by secondary device 206. In an embodiment, the detection or determination of another user may be in response to a request from communication server 202, e.g., if the communication server is trying to reach another user of the communication service. In this embodiment, communication server 202 may send relevant data that may identify the other user (e.g., photo or facial data, voice data, etc.) that a secondary device 206 may use to determine if other detected persons are a match. In an embodiment, a secondary device 206 may request a specific identification model from communication server 202 (e.g., facial recognition model, voice recognition model, etc.), depending on what data is available to the secondary device regarding other detected persons. It should be understood by one of ordinary skill in the art that user device(s) 204 may similarly detect other users of the communication system and send the associated information to communication server 202. However, since FIG. 2A is meant to show the tracking of a user of user device(s) 204, this is not shown in the figure to simplify discussion.

In embodiments, one or more actions 220-236 may depend upon preset preferences and/or conditions defined for the user of user device(s) 204 and/or the users of one or more of secondary device(s) 206.

Communication server 202 may continue to receive the information provided by user device(s) 204 and secondary device(s) 206, and may store and/or update the received information (237). Communication server 202 may use the most current stored information to determine communication options for reaching the user (238). Communication server 202 may make this determination using one or more algorithms for reconciling the current tracking information for a user. In embodiments, this determination may be done periodically, every time an update regarding the user is received, when needed (e.g., when a third party is trying to reach the user through the service), etc. As the current tracking information for a user may indicate that there are various options available for reaching the user, in an embodiment, communication server 202 may, as part of its communication option determination, determine a prioritized list of how to reach the user that may change as the tracking information changes. In an embodiment, determination 238 may depend upon preset preferences and/or conditions defined for the user of user device(s) 204 and/or users of one or more of secondary device(s) 206.

FIG. 2B illustrates a sequence diagram 200B for delivering a message to a user when a delivery option is available, according to an embodiment. Communication server 202 may receive a message for a user from a third party device (240). The source of the message may have been from, for example, a text, a telephone call, an email, etc., for the user from a third party using a third party device. Based on the determination of communication options for the user in action 238, communication server may send a communication to one or more of user device(s) 204 and/or secondary device(s) 206 that the communication server has determined are available to receive communications for the user (242). In an embodiment, communication server 202 may send the communication to a secondary message device (e.g., an electronic message board, an electronic intercom system, etc.) that may be associated with one or more of secondary device(s) 206 (e.g., through a secondary service common to both a secondary device 206 and a secondary message device). In embodiments, communication server 202 may send the communication to all of the available devices 204/206 at once, to one or more of the available devices 204/206 in a sequential prioritized order, to the last known device in proximity of the intended user, to one or more devices 204/206 filtered according to preferences and/or conditions set for the intended user or users of secondary device(s) 206, etc., for example. In embodiments, the manner in which the communication may be provided may include a display of the message on the communication service application or web page of the receiving device, a text message, an email, a telephone call, etc., which may depend on preset user preferences and/or conditions of the users of user device(s) 204 and/or secondary device(s) 206. In embodiments, the communication may include the message itself, or may include a request for the user to contact the communication service, dependent upon any relevant user preferences and/or conditions. In embodiments, the communication may be indicated to be for the user identified by a name, an alias, a photo, etc., dependent upon any relevant user preferences and/or conditions. User device(s) 204 and secondary device(s) 206 that receive the communication from communication server 202 may display the communication via their respective user interfaces (244, 246). In an embodiment, the communication may be displayed on a secondary message device that may be associated with one or more of secondary device(s) 206.

If a user is made aware of a communication that requests the user contact the communication service for a message, a user device 204 may receive a request from the user to retrieve the message from the communication server (248), and may send a request for the message to communication server 202 (250). The user may request the message via the communication service application running on the user device, by logging into a website of the communication service on a browser running on the user device, by calling, texting, or emailing the communication service (e.g., with appropriate credentials), etc. Communication server 202 may provide the message to the user device 204 to be delivered to the user (252). In an embodiment, communication server 202 may provide the message in a manner specified by the user (e.g., in preset user preferences, in a manner specified at the time the user requested the message, etc.). The manner in which the message may be provided may include a display of the message on the communication service application or web page on the user device, a text message, an email, a telephone call, etc. In an embodiment, the user may request and receive the message using a device other than a user device 204 (e.g., a borrowed device (e.g., a smart-phone of a friend)), a public computing device (e.g., a public coffee-house terminal), a public telephone, etc.). In an embodiment, the user of a user device 204 may be allowed to confirm whether a message was successfully delivered to the user, and the user device 204 may send that confirmation to communication server 202. Similarly, if, for example, a message was delivered to a user verbally by a user of a secondary device 206, a user of the secondary device 206 may be allowed to confirm whether a message was successfully delivered to the intended user, and the secondary device 206 may send that confirmation to communication server 202.

FIG. 2C illustrates a sequence diagram 200C for finding a user and delivering a message to the user when no tracking information is currently available or when the user is otherwise unreachable, according to an embodiment. As in the discussion of FIG. 2B, communication server 202 may receive a message for a user from a third party device (240). If communication server 202 does not currently have tracking information for the user, or if communication server 202 has failed to reach the user per the discussion of FIG. 2B, communication server 202 may send a message to the third party device that the communication service is trying to reach the user (254). In an embodiment, depending upon any user preferences or conditions, the message to the third party device may indicate why the user may be unreachable (e.g., the user is located in, or is traveling through, a dead zone, etc.), and/or may provide other information that may be useful to the third party (e.g., where the user was last detected, who the user was with, etc.). To attempt to reach the user, communication server 202 may send a request for user proximity information, along with user identifying information, to one or more secondary device(s) 206 (256). The request may include a communication to be delivered to the intended user, if located. The user identifying information may include, for example, a photo of the user, photo or facial details of the user, a voiceprint of the user, voice details of the user, a name of the user, a physical description of the user, etc. The request may be sent to a filtered group of secondary device(s) 206, depending on such factors as, for example, preferences and/or conditions set for the intended user or users of secondary device(s) 206, potential location indicators for the intended user (e.g., based on past historical location data regarding the user, the last known locations where the user was tracked, etc.), etc. In an embodiment, the request may be sent to a secondary device 206 of a person who was recently with the intended user (according to historical data, and/or previous location data, for example) though no longer in proximity of the intended user. That person may be able to provide some insight as to where the intended user currently is and/or how to communicate with the intended user, and this information may be useful in reaching the intended user and/or providing feedback to the person trying to reach the user (if the user settings allow this).

One or more of the secondary device(s) 206 that receive the request for proximity information for the user may determine if the user is proximate (258). This determination may be made using the user identifying information that accompanied the request, using, for example, a user detection method as discussed above. For example, if a voiceprint was received, a secondary device 206 may detect voices that are proximate and compare the voices to the voice print to determine if there is a match. In another example, if photo or facial details were received, a secondary device 206 may detect faces with its camera and compare the facial details to determine if there is a match. In yet another example, if a name of the user was received by a secondary device 206 that may be a user device of a known friend of the user (e.g., a friend previously specified by the user, a friend related to the user in a social network, etc.), then the secondary device 206 may ask its user if that particular friend is with him or her. One or more of the secondary device(s) 206 that received the request from the communication server 202 may send user proximity information to communication server 202 (260). If one or more of the secondary device(s) 206 indicated that the user is proximate, the communication server 202 may send the communication intended for the user to the proximate secondary device(s) 206 (262) (if it was not sent with the request) in a similar manner as was discussed with reference to FIG. 2B. In embodiments, any of actions 254-262 may be dependent on preset preferences and/or conditions of the user of user device(s) 204 and/or users of secondary device(s) 206.

Also shown in FIG. 2C is that user device(s) 204 may allow a user to edit that user's preferences and/or conditions (264) at any time using a user interface of a user device 204 (e.g., via the communication service application, via a website of the communication service, etc.). The edited user preferences and/or conditions may be sent to communication server 202.

Figure 3:
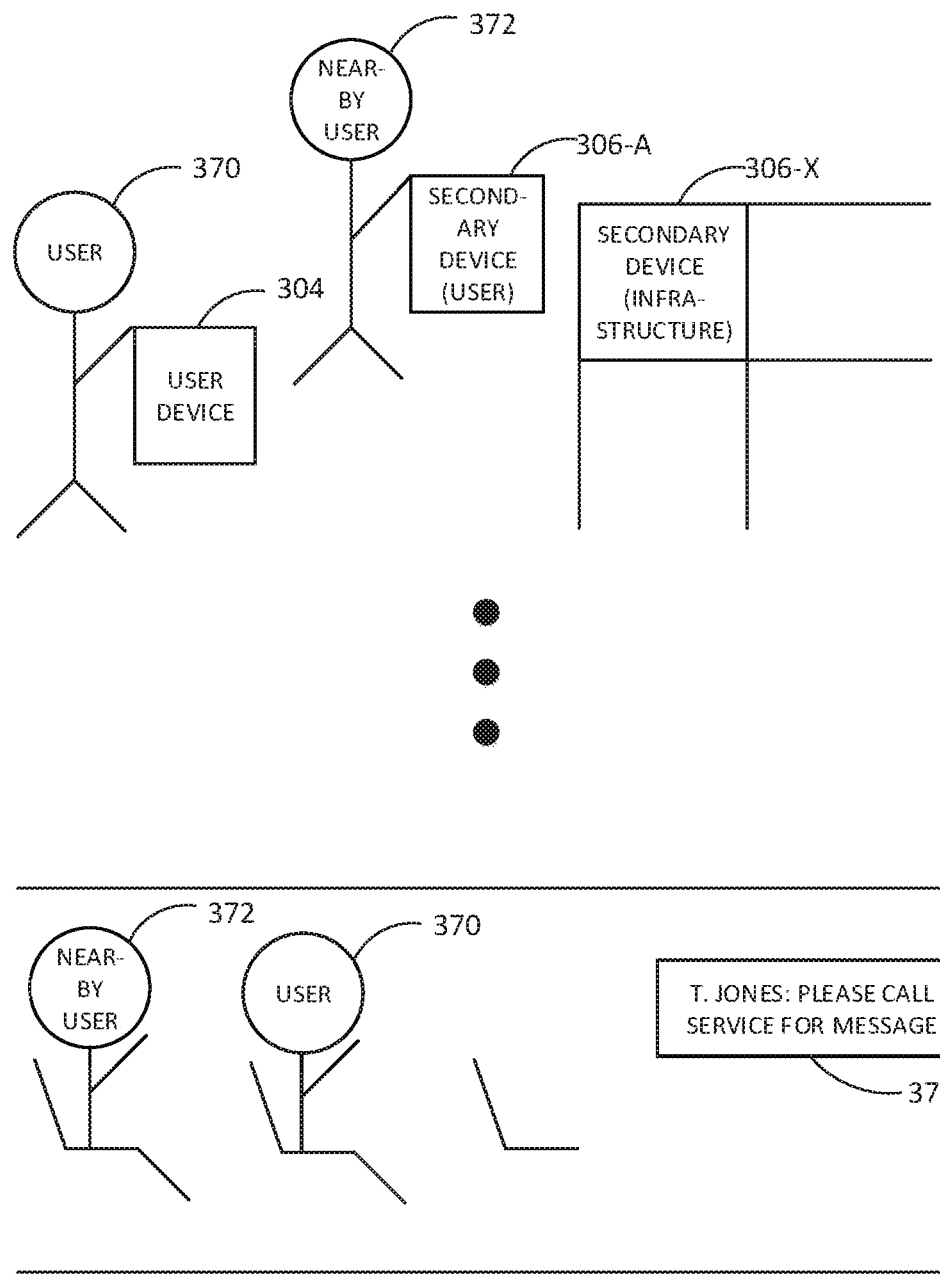
FIG. 3 is a block diagram illustrating example usage of the system described herein, according to an embodiment.

FIG. 3 is a block diagram illustrating example usage of the communication system and service described herein, according to an embodiment. In FIG. 3, a user 370 registered with a communication service is about to travel by subway. The user 370 is carrying a user device 304 (e.g., a smart phone) that is turned on, with a communication service application loaded and running on it. User device 304 is attached to the user's hip. User device 304 cannot "see" the user with its camera or "hear" the user with its microphone, as the user 370 is not speaking. However, user device 304 detects that it is moving and determines that the detected gait pattern is that of user 370. User device 304 sends user proximity information to a communication server of the communication system indicating that user 370 is in proximity of user device 304. The communication server stores the user proximity information, or updates any previously stored user proximity information from user device 304 with this new user proximity information regarding user 370. Walking close to user 370 is a nearby user 372 registered with the communication system. Nearby user 372 is carrying a secondary device 306-A (e.g., a tablet device) that is turned on, with the communication service application loaded and running on it. As the nearby user 372 is actively using secondary device 306-A by attempting to look for directions, secondary device 306-A sends user proximity information regarding nearby user 372 to the communication server indicating that nearby user 372 is in proximity of secondary device 306-A. The communication server stores the user proximity information from secondary device 306-A, or updates any previously stored user proximity information from secondary device 306-A with this new user proximity information regarding nearby user 372.

User 370 is walking behind nearby user 372, as they enter the subway station. Secondary device 306-A detects user 370 with its camera and also detects user device 304. Secondary device 306-A sends additional user proximity information regarding user 370, as well as device proximity information regarding user device 304, to the communication server. User device 304 also detects secondary device 306-A and sends device proximity information regarding secondary device 306-A to the communication server. User device 304 detects that the user is about to go down into a subway station and sends a tracking loss warning to the communication server indicating that tracking of user 370 by user device 304 may soon be lost.

In the meantime, the communication server receives a message for user 370 from a third party who is trying to reach user 370. Knowing that user device 304 is in proximity of user 370, communication server attempts to send the message to user device 304, but is unsuccessful as user 370 does not hear or feel user device 304 announce the presence of a message. Knowing that secondary device 306-A is also in proximity of user 370, the communication server sends a communication to secondary device 306-A indicating that there is a message for a user of the communication system that is nearby. As it turns out, user 370 and nearby user 372 are friends traveling together, and the communication server is aware of this based on user-defined preferences and/or conditions of user 370 and/or nearby user 372. The communication sent to secondary device 306-A by the communication server states that there is a message for user 370, indicated by name, and also displays the message. Nearby user 372 relays the message to user 370, and indicates on secondary device 306-A that the message was delivered to user 370. Secondary device 306-A sends a confirmation message to the communication server indicating that the message was successfully delivered to user 370.

User 370 and nearby user 372 are headed to the smart card reader that will allow them access to the subway trains. The smart card reader happens to be a secondary device 306-X that is recognized by the communication service. The smart card reader (i.e., secondary device 306-X) is not associated with any particular user, but is part of the infrastructure of the subway system. When user 370 and nearby user 372 approach secondary device 306-X, user device 304, secondary device 306-A, and secondary device 306-X all detect each other and send this device proximity information to the communication server. In addition, by using their smart cards, secondary device 306-X is also able to provide information to a subway service server that these two passengers have swiped their cards at that card reader. The subway service server, being a recognized participant of the communication service, may then communicate the user proximity information and/or the device proximity information provided by secondary device 306-X to the communication server to indicate that these two users were recently in proximity of secondary device 306-X.

User 370 and nearby user 372 enter the tunnels of the subway system and eventually hop aboard a subway train. In the meantime, the communication server receives a second message for user 370 from another third party who is trying to reach user 370. The communication server has lost tracking from user device 304 and secondary device 306-A, but knows that user 370 was last tracked by secondary device 306-X via the subway service server(s). Therefore, the communication server sends a communication to the subway service server(s) with a request that it be displayed on display devices of the subway trains and subway stations serviced by the lines associated with the entry point (e.g., subway station) that user 370 used to enter the subway system. Sure enough, user 370 sees a displayed message 374 directed to user 370 while on the train that requests that user 370 contact the communication service for a message. User 370 contacts the service for the message as soon as user 370 exits the subway system.

Figure 4:
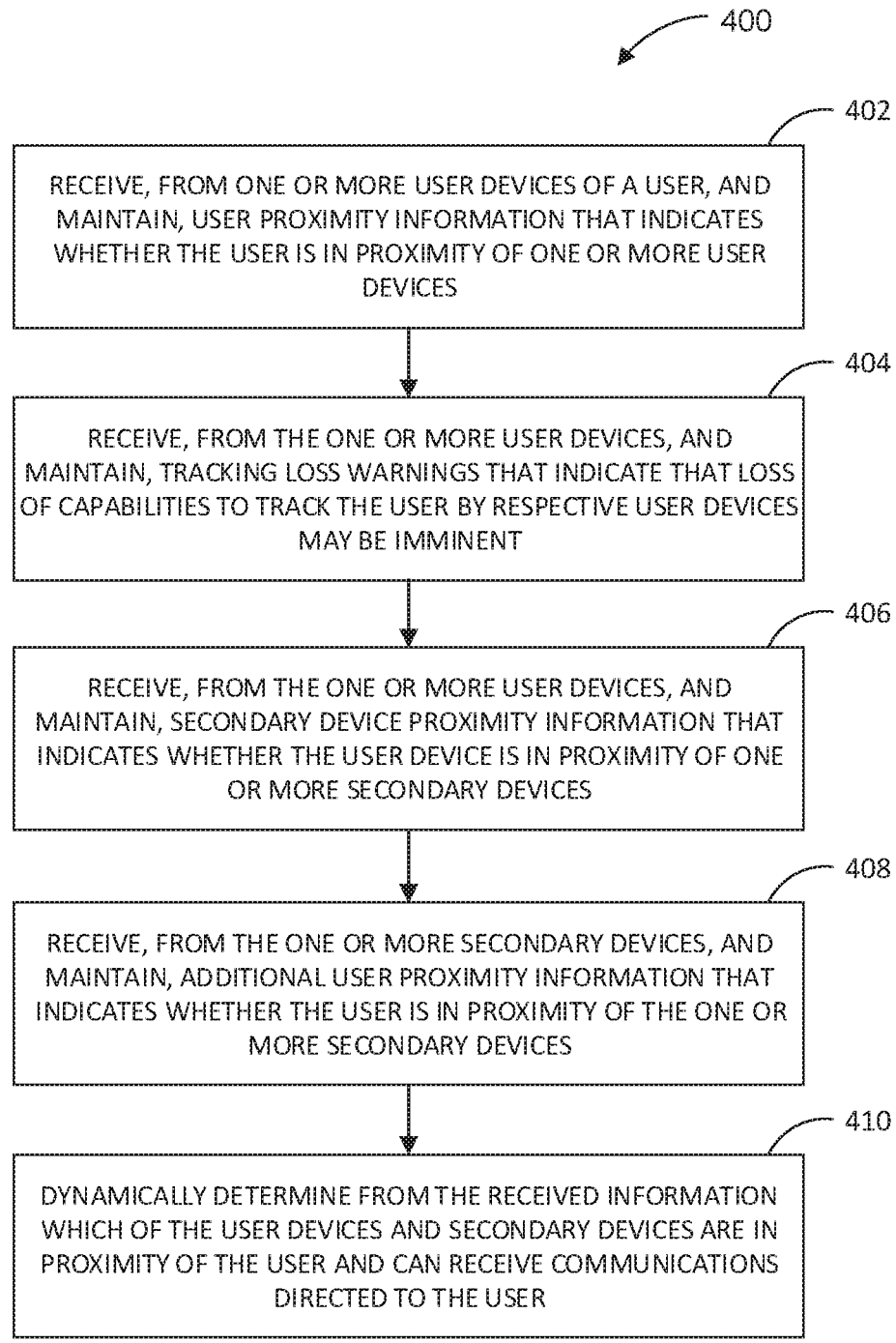
FIG. 4 is a flow diagram illustrating an example process flow from the perspective of a communication server, according to an embodiment.
Figure 5:
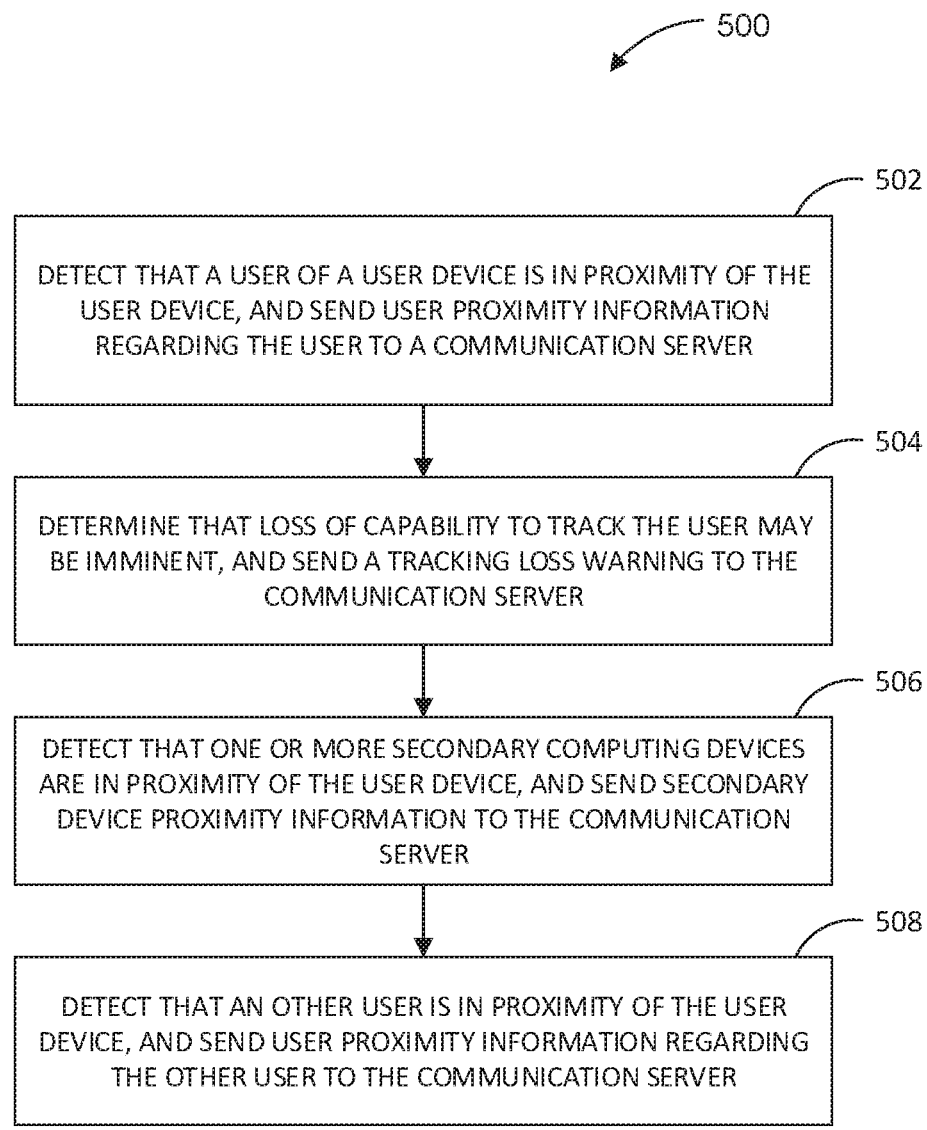
FIG. 5 is a flow diagram illustrating an example process flow from the perspective of a user device, according to an embodiment.

As illustrated in the example of FIG. 3, a main feature of the technologies disclosed herein includes the collaboration of context-aware devices to provide near real-time tracking information of a user of the communication service. In embodiments described herein, this collaboration may be considered to include, for example, four main aspects. A first aspect may involve one or more user devices tracking a user of those user devices, where the one or more user devices may report to the communication server of a communication service when the user is detected as well as when the user is not detected or is no longer detected. A second aspect may involve one or more user devices predicting the loss of tracking of the user, where the one or more user devices may send a warning to the communication server that capability to track the user may soon be lost (e.g., if the user device is about to run out of charge, if network connectivity becomes too weak, if the user is about to travel into an area that is known to have little to no network connectivity (e.g., a dead zone, a tunnel, etc.), etc.). A third aspect may involve one or more user devices detecting and reporting to the communication server one or more secondary devices in proximity of the user device, which may let the communication service know with "whom" the user is, and may be useful in tracking the user of the user device as well as a user of the secondary device. As secondary devices may also include infrastructure devices (cameras, badge readers, train card readers, other types of sensors, etc.), this information may also be useful to the communications server in determining where a user is and what other infrastructure devices may be able to track or communicate with the user. A fourth aspect may involve a user device detecting other users recognized by the system, without cooperation of user devices of those other users. FIGS. 4 and 5 are flow diagrams illustrating these collaboration aspects, where the diagram of FIG. 4 is from the perspective of a communication server, and the diagram of FIG. 5 is from the perspective of a user device.

FIG. 4 is a flow diagram 400 illustrating an example process flow from the perspective of a communication server, according to an embodiment. At 402, user proximity information may be received from one or more user devices of a user and maintained, where the user proximity information indicates whether the user is in proximity of one or more of the user devices. At 404, tracking loss warnings may be received from the one or more user devices and maintained, where the tracking loss warnings indicate that loss of capabilities to track the user by those user devices may be imminent. At 406, secondary device proximity information may be received from the one or more user devices and maintained, where the secondary device proximity information indicates whether the user is in proximity of one or more secondary devices. At 408, additional user proximity information is received from one or more secondary devices and maintained, where the additional user proximity information indicates whether the user is in proximity of one or more of the secondary devices. The communication server may continue to be updated by the user and secondary devices, and the information is maintained so that the communication server may determine, with the most current information, possible communication options for communicating with a user, as was discussed in more detail above with respect to FIG. 2A. This is indicated at 410, where it is dynamically determined from the received information which of the user devices and secondary devices are in proximity of the user and can receive communications directed to the user.

FIG. 5 is a flow diagram 500 illustrating an example process flow from the perspective of a user device, according to an embodiment. At 502, the user device may detect that the user of the user device is in proximity of the user device (or detect that the user is no longer in proximity of the user device) and send user proximity information regarding the user to a communication server. A user may be detected by the user's own user devices in various ways, as described earlier with reference to FIG. 2A.

At 504, the user device may determine that loss of capability to track the user may be imminent, and may send a tracking loss warning to the communication server. The determination of loss of tracking capability may be accomplished in various ways, as described above with reference to FIG. 2A.

At 506, the user device may determine that one or more secondary devices are in proximity of the user device, and may send secondary device proximity information to the communication server. The determination of secondary device proximity may be accomplished in various ways, as described earlier with reference to FIG. 2A.

At 508, the user device may detect that an other user (another person who may use the communication service) is in proximity of the user device, and may send user proximity information regarding the other user to the communication server. This detection may be accomplished in a similar manner to that of the user device detecting its own user (e.g., via facial recognition, speaker identification, etc.), or the user of the user device may proactively identify one or more other users by entering identifying information for the other user(s) via a user interface of the user device. This was discussed in more detail above with respect to actions 234 and 236 of secondary device(s) 206 in FIG. 2A.

In embodiments, each action of 502-508 of diagram 500 may occur in any order and may continue to update the communication server, as detections or determinations occur or no longer occur. In embodiments, the actions of 502-508 may or may not be executed depending upon preferences of users of the communication system regarding what information a user wants tracked and/or how the user wants it tracked, as was previously discussed. For example, a user may want to allow the user's own user devices to track and/or detect him or her, but may not want the devices of others to track and/or detect him or her. In this way, the user maintains some control over tracking of him or her. Additionally, in embodiments, user privacy may be maintained as the actual identity of users need not be revealed for user tracking.

There are other additional useful features that may be incorporated into a system such as the system described herein. For example, communication logs may be stored and accessed to review previous messages if ever needed. Another useful feature may include storing historical data regarding locations of a user, when the user was at those locations, what devices were able to track the user, etc., and using this information to train the system as to the most successful ways to track and/or provide messages to the user. There may be other features included that provide similar training of the system, where training "games" may be provided to users, including users that know each other, for example, that help the system predict a user's location and/or learn more successful ways to track and/or provide messages to the user. Storing historical information and building a model may help the system predict where a user might be based on known previous points and history of a user. A training game may be one of many ways to help the system improve the prediction of where someone is by using knowledge of others who know the user. It may also be part of the system in regular use to leverage people that tend to repeatedly come within proximity of a user.

The more devices that collaborate in tracking a user, the more likely that the user is indeed the correct user being tracked and the more likely that a message for that user will ultimately reach that user. With that in mind, another useful feature that may be incorporated into a communication system such as that described herein may include determining a confidence level of reaching a user. The confidence level may be based on, for example, the number of devices currently tracking the user, what devices are tracking the user, how those devices are tracking the user, etc. The confidence level may be provided by a communication server to a third party that is trying to reach the user. In an example, a confidence level may be useful in determining whether a user would like the service to reach out to someone else to help reach the user. If the service knows with high confidence (e.g., based on a set threshold) that a particular person is with the user, it is acceptable to reach out to that person. However, if the confidence level is low (e.g., lower than a set threshold), it is not acceptable to reach out to that person, and this may also translate to poor user experience.

Figure 6:
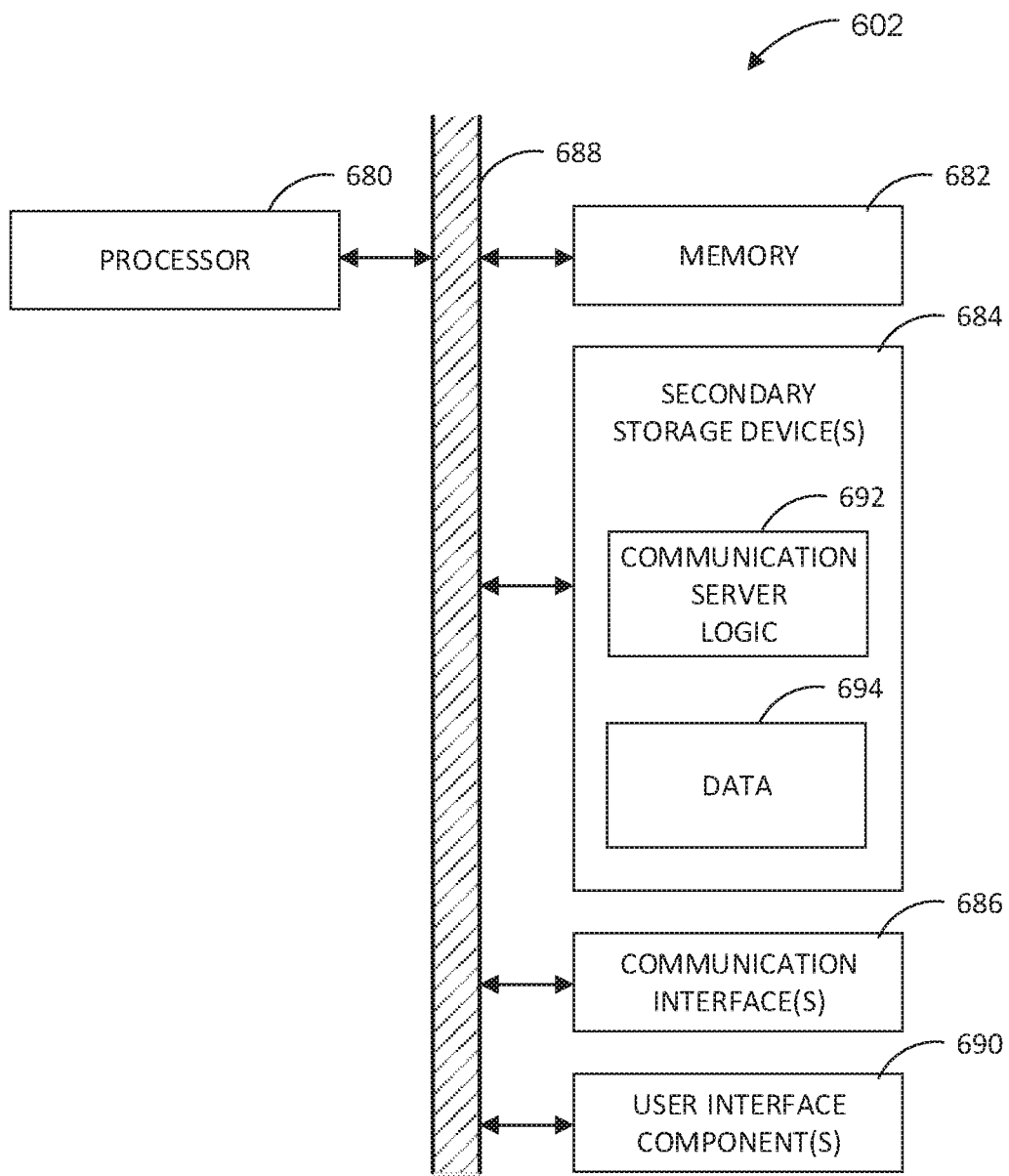
FIG. 6 is a block diagram of an example communication server, according to an embodiment.

FIG. 6 is a block diagram of an example communication server 602, according to an embodiment. The communication server 602 may represent, for example, the communication servers 102 and 202 of FIGS. 1 and 2A-2C, respectively. As illustrated, communication server 602 may include a processor or controller 680 connected to memory 682, one or more secondary storage devices 684, and a communication interface 686 by a link 688 or similar mechanism. The communication server 602 may optionally include user interface components 690 for use by a system or service administrator, for example, that may include, for example, a touchscreen, a display, one or more user input components (e.g., a keyboard, a mouse, etc.), a speaker, or the like, or any combination thereof. Note, however, that while not shown, communication server 602 may include additional components. The processor 680 may be a microprocessor, digital ASIC, FPGA, or similar hardware device. In an embodiment, the processor 680 may be a microprocessor, and software may be stored or loaded into the memory 682 for execution by the processor 680 to provide the functions described herein. The one or more secondary storage devices 684 may be, for example, one or more hard drives or the like, and may store logic 692 to be executed by the processor 680. The one or more secondary storage devices 684 may also, or instead, store data 694. Data 694 may include, for example, information that may be collected and maintained regarding the availability of user devices and/or secondary devices that may be in proximity to users or user devices, infrastructure device information, message information, historical data, communication logs, user information and/or profiles, etc. The communication interface 686 may be implemented in hardware or a combination of hardware and software. The communication interface 686 may provide a wired or wireless network interface to a network, such as network 108 shown in FIG. 1.

Figure 7:
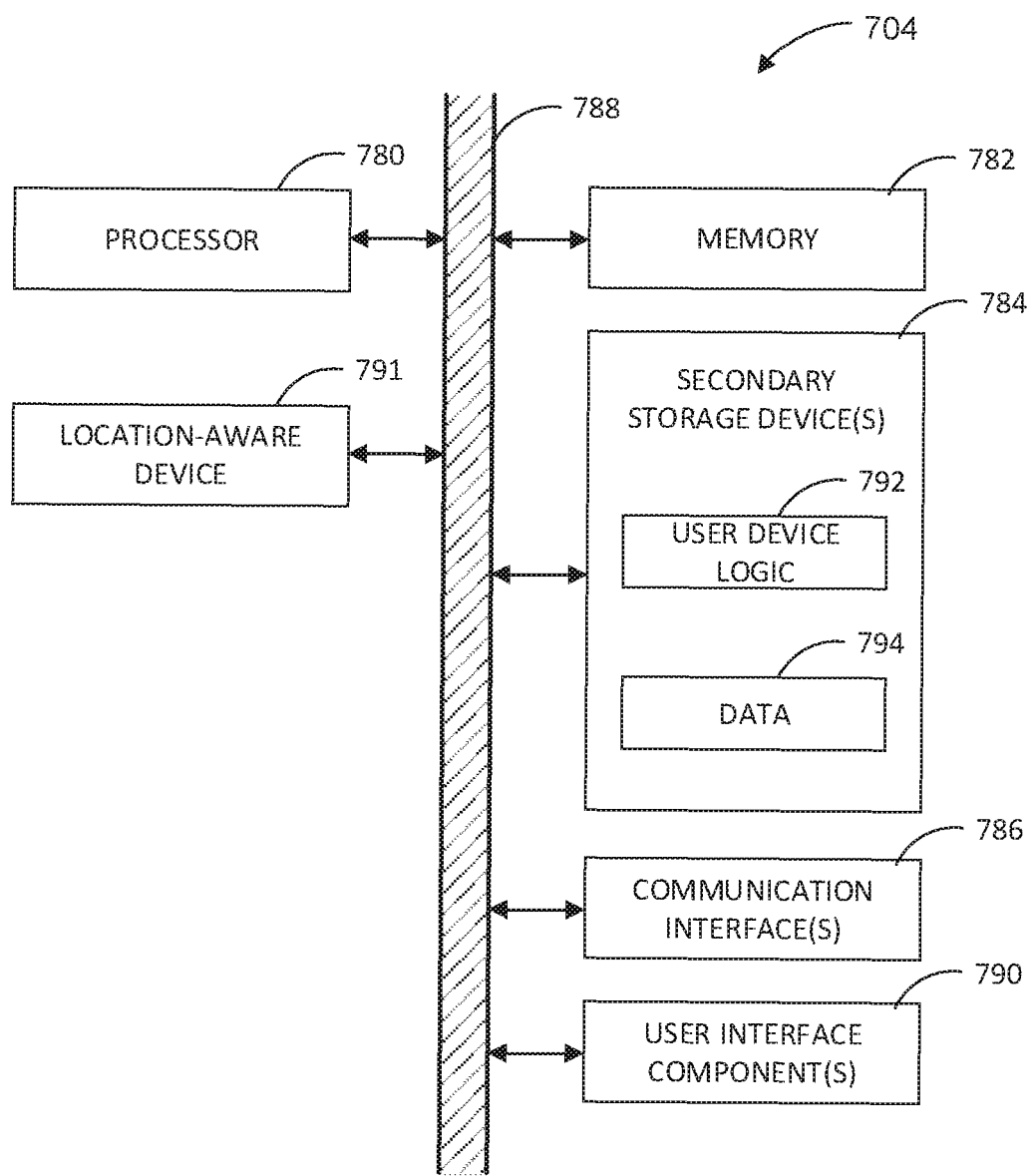
FIG. 7 is a block diagram of an example user device, according to an embodiment.

FIG. 7 is a block diagram of an example user device 704, according to an embodiment. The user device 704 may represent, for example, any of the user devices shown in FIGS. 1, 2A-C, and 3. As illustrated, user device 704 may include a processor or controller 780 connected to memory 782, one or more secondary storage devices 784, and a communication interface 786 by a link 788 or similar mechanism. The user device 704 may include user interface components 790 for use by a user of the user device 704 that may include, for example, a touchscreen, a display, one or more user input components (e.g., a keyboard, a mouse, etc.), a speaker, or the like, or any combination thereof. User device 704 may optionally include a location-aware device 791, such as a global positioning system (GPS) device or other location-aware device. Note, however, that while not shown, user device 704 may include additional components. The processor 780 may be a microprocessor, digital ASIC, FPGA, or similar hardware device. In an embodiment, the processor 780 may be a microprocessor, and software may be stored or loaded into the memory 782 for execution by the processor 780 to provide the functions described herein. The one or more secondary storage devices 784 may be, for example, one or more hard drives or the like, and may store logic 792 to be executed by the processor 780. The one or more secondary storage devices 784 may also, or instead, store data 794. Data 794 may include, for example, information that may be detected and/or maintained regarding the proximity of the user to user devices 704 and/or regarding secondary devices that may be in proximity of the user devices, message information, historical data, communication logs, user information and/or profiles, etc. The communication interface 786 may be implemented in hardware or a combination of hardware and software. The communication interface 786 may provide a wired or wireless network interface to a network, such as network 108 shown in FIG. 1.

Figure 8:
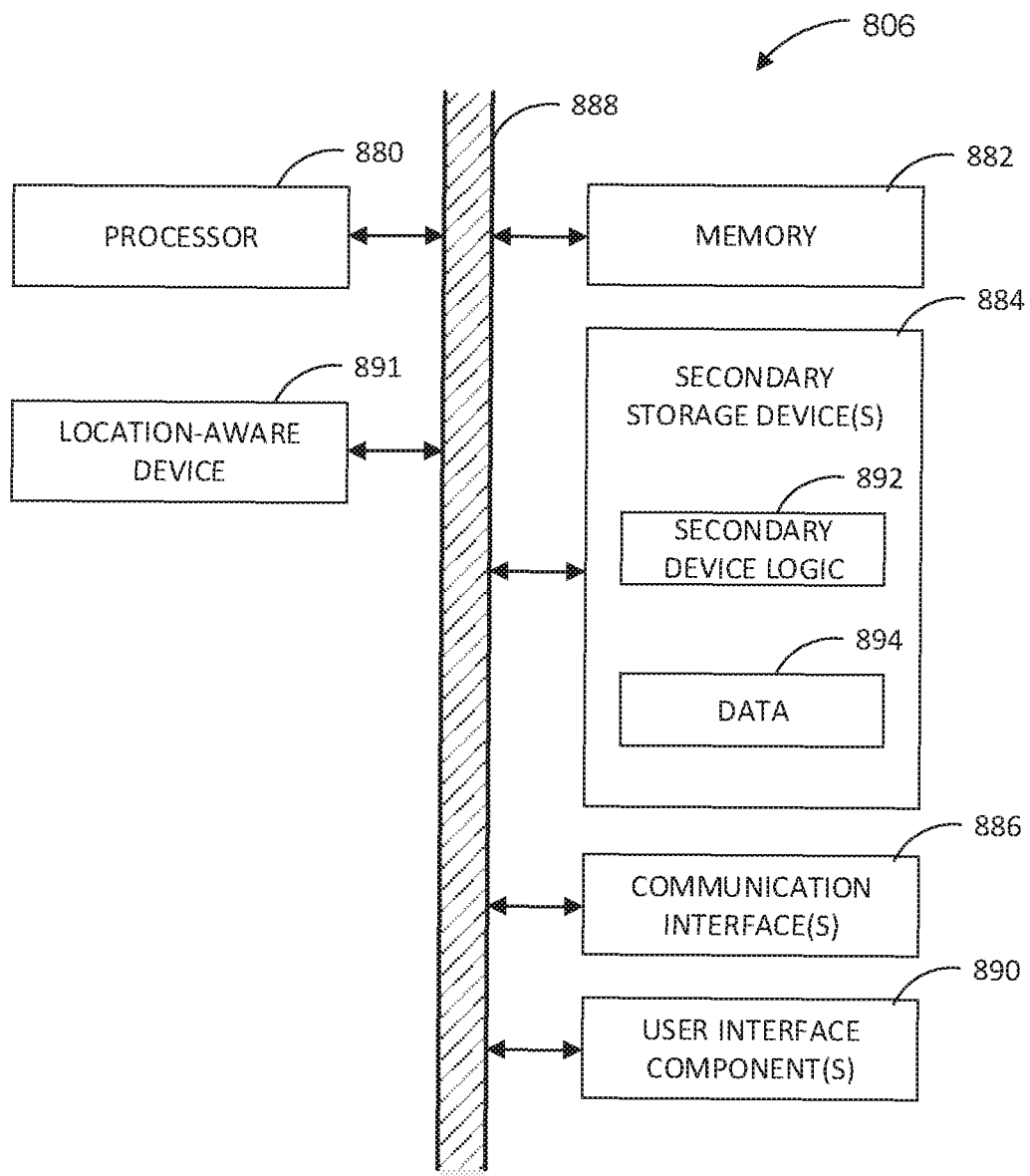
FIG. 8 is a block diagram of an example secondary device, according to an embodiment.

FIG. 8 is a block diagram of an example secondary device 806, according to an embodiment. The secondary device 806 may represent, for example, any of the secondary devices shown in FIGS. 1, 2A-C, and 3. As illustrated, secondary device 806 may include a processor or controller 880 connected to memory 882, one or more secondary storage devices 884, and a communication interface 886 by a link 888 or similar mechanism. The secondary device 806 may include user interface components 890 for use by a user of the secondary device 806 that may include, for example, a touchscreen, a display, one or more user input components (e.g., a keyboard, a mouse, etc.), a speaker, or the like, or any combination thereof. Secondary device 806 may optionally include a location-aware device 891, such as a global positioning system (GPS) device or other location-aware device. Note, however, that while not shown, secondary device 806 may include additional components. The processor 880 may be a microprocessor, digital ASIC, FPGA, or similar hardware device. In an embodiment, the processor 880 may be a microprocessor, and software may be stored or loaded into the memory 882 for execution by the processor 880 to provide the functions described herein. The one or more secondary storage devices 884 may be, for example, one or more hard drives or the like, and may store logic 892 to be executed by the processor 880. The one or more secondary storage devices 884 may also, or instead, store data 894. Data 894 may include, for example, information that may be detected and/or maintained regarding the proximity of the user of a secondary device to secondary device 806 and/or regarding other secondary devices or users that may be in proximity of secondary device 806, message information, historical data, communication logs, secondary device user information and/or profiles, etc. The communication interface 886 may be implemented in hardware or a combination of hardware and software. The communication interface 886 may provide a wired or wireless network interface to a network, such as network 108 shown in FIG. 1.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

As discussed above, one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

Technologies disclosed herein may improve the reachability of a user and provide communications to a user of a communication system, even when the personal communication devices of the user are unavailable or unreachable. The particular examples and scenarios used in this document are for ease of understanding and are not to be limiting. Features described herein may be used in many other contexts and situations that may or may not involve a subway station, for example, as was used in an example herein. For example, the concepts disclosed herein may extend to any environment in which electronic devices capable of tracking and/or communication are used.

There are various advantages of using the technologies described herein. One advantage is that even if, for example, the personal communication device(s) of a user are unavailable or unreachable, communications may still be delivered to the user. Another advantage is that a user may be tracked by device collaboration with little to no direct involvement of the user. In addition, the more devices that are able to detect and track a user, the more reliable the system is, and the more likely it is that the system will be able to reach the user with a message. A further advantage is that privacy of the users may be maintained based on user preferences and conditions with regard to how they are tracked and how, when, and by whom communications reach them. Many other advantages may also be contemplated.

As used in this application and in the claims, a list of items joined by the term "one or more of" can mean any combination of the listed terms. For example, the phrases "one or more of A, B or C" and "one or more of A, B, and C" can mean A; B; C; A and B; A and C; B and C; or A, B and C.

The following examples pertain to further embodiments.

Example 1 may include a context-aware communication server through which communication options for communicating with a user over a network may be tracked, the communication server comprising: a processor; a communications mechanism in communication with the processor and the network; and one or more storage devices electronically accessible by the processor, wherein the processor is configured to: receive, from one or more user devices of a user, and maintain in the one or more storage devices, user proximity information that indicates whether the user is in proximity of the one or more user devices; receive, from the one or more user devices, and maintain in the one or more storage devices, tracking loss warnings that indicate that loss of capabilities to track the user by respective user devices may be imminent; receive, from the one or more user devices, and maintain in the one or more storage devices, secondary device proximity information that indicates whether the user is in proximity of one or more secondary devices; receive, from the one or more secondary devices, and maintain in the one or more storage devices, additional user proximity information that indicates whether the user is in proximity of the one or more secondary devices; and dynamically determine from one or more of the user proximity information, the tracking loss warnings, the secondary device proximity information, or the additional user proximity information, which of the user devices and secondary devices are in proximity of the user and can receive communications directed to the user.

Example 2 may include the subject matter of Example 1, wherein the receiving of user proximity information, tracking loss warnings, secondary device proximity information, and additional user proximity information depend upon previously designated preferences of one or more of the user or users of the secondary devices.

Example 3 may include the subject matter of Example 1 or Example 2, wherein the processor is further configured to dynamically determine and maintain a prioritized list of which of the user devices and secondary devices are in proximity of the user and can receive communications directed to the user.

Example 4 may include the subject matter of any one of Examples 1-3, wherein the secondary devices include one or more of personal computing devices of other users or infrastructure devices unassociated with any particular user.

Example 5 may include the subject matter of any one of Examples 1-4, wherein the processor is further configured to receive, from a third party device, a message directed to the user.

Example 6 may include the subject matter of Example 5, wherein the processor is further configured to send a communication regarding the message to one or more of the one or more user devices, the one or more secondary devices, or one or more communication devices associated with the one or more secondary devices, that have been determined to be in proximity of the user.

Example 7 may include the subject matter of Example 6, wherein the sending the communication to the one or more secondary devices includes sending the communication to one or more communication devices associated with the one or more secondary devices.

Example 8 may include the subject matter of Example 6 or Example 7, wherein the communication includes a request for the user to contact a service associated with the communication server.

Example 9 may include the subject matter of Example 8, wherein the processor is further configured to receive a request for the message from the user and deliver the message to the user.

Example 10 may include the subject matter of any one of Examples 6-9, wherein the communication includes the message.

Example 11 may include the subject matter of any one of Examples 6-10, wherein the sending of the communication depends on previously designated conditions of one or more of the user or users of the secondary devices.

Example 12 may include the subject matter of Example 11, wherein the conditions include at least one of what user devices may be used for delivering communications, what secondary devices may be used for delivering communications, conditions related to urgency of the message, conditions related to time of day, conditions related to day of the week, conditions related to location of the user, and conditions related to an identity of a person leaving the message.

Example 13 may include the subject matter of any one of Examples 5-8 and 10-12, wherein the processor is further configured to, if the user cannot presently be contacted via one or more user devices or secondary devices, send a message to the third party device indicating that the user cannot presently be contacted and that the message will be delivered once the user can be contacted.

Example 14 may include the subject matter of any one of Examples 5-8 and 10-13, wherein the processor is further configured to: if the user cannot presently be contacted, send, to one or more of the secondary devices, a user identifier and a request to determine if the user is in proximity of the respective secondary device; and if a response is received from one or more of the secondary devices that indicates that the user is in proximity, send a communication regarding the message to one or more of the one or more secondary devices or communication devices associated with the one or more secondary devices that are in proximity of the user.

Example 15 may include an apparatus for tracking communication options for communicating with a user, comprising: means for receiving, from one or more user devices of a user, and maintaining, user proximity information that indicates whether the user is in proximity of the one or more user devices; means for receiving, from the one or more user devices, and maintaining, tracking loss warnings that indicate that loss of capabilities to track the user by respective user devices may be imminent; means for receiving, from the one or more user devices, and maintaining, secondary device proximity information that indicates whether the user device is in proximity of one or more secondary devices; means for receiving, from the one or more secondary devices, and maintaining, additional user proximity information that indicates whether the user is in proximity of the one or more secondary devices; and means for dynamically determining from one or more of the user proximity information, the tracking loss warnings, the secondary device proximity information, or the additional user proximity information, which of the user devices and secondary devices are in proximity of the user and can receive communications directed to the user.

Example 16 may include the subject matter of Example 15, wherein the secondary devices include one or more of personal computing devices of other users or infrastructure devices unassociated with any particular user.

In Example 17, Example 15 or Example 16 may optionally include means for receiving, from a third party device, a message directed to the user.

In Example 18, Example 17 may optionally include means for sending a communication regarding the message to one or more of the one or more user devices, the one or more secondary devices, or one or more communication devices associated with the one or more secondary devices, that have been determined to be in proximity of the user.

In Example 19, Example 17 or Example 18 may optionally include means for sending, to one or more of the secondary devices, a user identifier and a request to determine if the user is in proximity of the respective secondary device, if the user cannot presently be contacted; and means for sending a communication regarding the message to one or more of the one or more secondary devices or communication devices associated with the one or more secondary devices that are in proximity of the user, if a response is received from one or more of the secondary devices that indicates that the user is in proximity.

Example 20 may include a computer-readable medium storing control logic configured to instruct a processor of a communication server to: receive, from one or more user devices of a user, and maintain, user proximity information that indicates whether the user is in proximity of the one or more user devices; receive, from the one or more user devices, and maintain, tracking loss warnings that indicate that loss of capabilities to track the user by respective user devices may be imminent; receive, from the one or more user devices, and maintain, secondary device proximity information that indicates whether the user device is in proximity of one or more secondary devices; receive, from the one or more secondary devices, and maintain, additional user proximity information that indicates whether the user is in proximity of the one or more secondary devices; and dynamically determine from one or more of the user proximity information, the tracking loss warnings, the secondary device proximity information, or the additional user proximity information, which of the user devices and secondary devices are in proximity of the user and can receive communications directed to the user.

Example 21 may include the subject matter of Example 20, wherein the secondary devices include one or more of personal computing devices of other users or infrastructure devices unassociated with any particular user.

Example 22 may include the subject matter of Example 20 or Example 21, wherein the control logic is further configured to instruct the processor to receive, from a third party device, a message directed to the user.

Example 23 may include the subject matter of Example 22, wherein the control logic is further configured to instruct the processor to send a communication regarding the message to one or more of the one or more user devices, the one or more secondary devices, or one or more communication devices associated with the one or more secondary devices, that have been determined to be in proximity of the user.

Example 24 may include the subject matter of Example 22 or Example 23, wherein the control logic is further configured to instruct the processor to: if the user cannot presently be contacted, send, to one or more of the secondary devices, a user identifier and a request to determine if the user is in proximity of the respective secondary device; and if a response is received from one or more of the secondary devices that indicates that the user is in proximity, send a communication regarding the message to one or more of the one or more secondary devices or communication devices associated with the one or more secondary devices that are in proximity of the user.

Example 25 may include a method of tracking communication options for communicating with a user, comprising: receiving, from one or more user devices of a user, and maintaining, user proximity information that indicates whether the user is in proximity of the one or more user devices; receiving, from the one or more user devices, and maintaining, tracking loss warnings that indicate that loss of capabilities to track the user by respective user devices may be imminent; receiving, from the one or more user devices, and maintaining, secondary device proximity information that indicates whether the user device is in proximity of one or more secondary devices; receiving, from the one or more secondary devices, and maintaining, additional user proximity information that indicates whether the user is in proximity of the one or more secondary devices; and dynamically determining from one or more of the user proximity information, the tracking loss warnings, the secondary device proximity information, or the additional user proximity information, which of the user devices and secondary devices are in proximity of the user and can receive communications directed to the user.

Example 26 may include the subject matter of Example 25, wherein the secondary devices include one or more of personal computing devices of other users or infrastructure devices unassociated with any particular user.

In Example 27, Example 25 or Example 26 may optionally include receiving, from a third party device, a message directed to the user.

In Example 28, Example 27 may optionally include sending a communication regarding the message to one or more of the one or more user devices, the one or more secondary devices, or one or more communication devices associated with the one or more secondary devices, that have been determined to be in proximity of the user.

In Example 29, Example 27 or Example 28 may optionally include: if the user cannot presently be contacted, sending, to one or more of the secondary devices, a user identifier and a request to determine if the user is in proximity of the respective secondary device; and if a response is received from one or more of the secondary devices that indicates that the user is in proximity, sending a communication regarding the message to one or more of the one or more secondary devices or one or more communication devices associated with the one or more secondary devices that are in proximity of the user.

Example 30 may include at least one machine readable medium comprising a plurality of instructions that in response to being executed on a computing device, cause the computing device to carry out a method according to any one of Examples 25-29.

Example 31 may include an apparatus configured to perform the method of any one of Examples 25-29.

Example 32 may include a computer system to perform the method of any one of Examples 25-29.

Example 33 may include a machine to perform the method of any one of Examples 25-29.

Example 34 may include an apparatus comprising means for performing the method of any one of Examples 25-29.

Example 35 may include a computing device comprising memory and a chipset configured to perform the method of any one of Examples 25-29.

Example 36 may include a context-aware computing device, comprising: a processor; a communications mechanism in communication with the processor and the network; and a user interface in communication with the processor, wherein the processor is configured to: detect that a user of the computing device is in proximity of the computing device, and send user proximity information regarding the user to a communication server; determine that loss of capability to track the user may be imminent, and send a tracking loss warning to the communication server; detect that one or more secondary computing devices are in proximity of the computing device, and send secondary device proximity information to the communication server; and detect that an other user is in proximity of the computing device, and send user proximity information regarding the other user to the communication server.

Example 37 may include the subject matter of Example 36, wherein the detecting that the user is in proximity of the computing device, the determining that loss of capability to track the user may be imminent, the detecting that the one or more secondary computing devices are in proximity of the computing device, and the detecting that an other user is in proximity of the computing device depend upon previously designated preferences of one or more of the user or users of the secondary computing devices.

Example 38 may include the subject matter of Example 36 or Example 37, wherein the secondary computing devices include one or more of personal computing devices of users other than the user or infrastructure devices unassociated with any particular user.

Example 39 may include the subject matter of any one of Examples 36-38, wherein the processor is further configured to receive and display, via the user interface, a communication from the communication server regarding a message directed to the user.

Example 40 may include the subject matter of Example 39, wherein the communication includes a request for the user to contact a service associated with the communication server. Example 41 may include the subject matter of Example 40, wherein the processor is further configured to: receive a request for the message from the user via the user interface; and send the request for the message to the communication server.

Example 42 may include the subject matter of any one of Examples 39-41, wherein the communication includes the message.

Example 43 may include the subject matter of any one of Examples 36-42, wherein the processor is further configured to: receive, from the communication server, a user identifier associated with a user other than the user and a request to determine if the user associated with the user identifier is in proximity of the computing device; determine whether the user associated with the user identifier is in proximity of the computing device; and send, to the communication server, the result of the determination whether the user associated with the user identifier is in proximity of the computing device.

Example 44 may include the subject matter of any one of Examples 36-43, wherein the detecting that the user or the other user is in proximity of the computing device includes at least one of detecting that the user is using the computing device, detecting that the user has recently used the computing device, facial recognition, speaker identification, gait identification, and user-entered identification.

Example 45 may include the subject matter of any one of Examples 36-44, wherein the detecting that the one or more secondary computing devices are in proximity of the user includes at least one of audio proximity detection and radio received signal strength indication (RSSI).

Example 46 may include the subject matter of any one of Examples 36-45, wherein the processor is further configured to allow the user to edit one or more of user preferences regarding tracking or user conditions regarding communications.

Example 47 may include the subject matter of Example 46, wherein the user preferences include at least one of what computing devices associated with the user are to be used for tracking the user, how the user devices associated with the user are to be used for tracking the user, what secondary computing devices are to be used for tracking the user, and how the secondary computing devices are to be used for tracking the user.

Example 48 may include the subject matter of Example 46 or Example 47, wherein the user conditions include at least one of what user devices may be used for receiving communications, what secondary computing devices may be used for receiving communications, conditions related to urgency of the message, conditions related to time of day, conditions related to day of the week, conditions related to location of the user, and conditions related to an identity of a person leaving the message.

Example 49 may include an apparatus for tracking communication options, comprising: means for detecting that a user of the apparatus is in proximity of the apparatus, and sending user proximity information regarding the user to a communication server; means for determining that loss of capability to track the user may be imminent, and sending a tracking loss warning to the communication server; means for detecting that one or more secondary computing devices are in proximity of the apparatus, and sending secondary device proximity information to the communication server; and means for detecting that an other user is in proximity of the computing device, and sending user proximity information regarding the other user to the communication server.

Example 50 may include the subject matter of Example 49, wherein the secondary computing devices include one or more of personal computing devices of users other than the user or infrastructure devices unassociated with any particular user.

In Example 51, Example 49 or Example 50 may optionally include means for receiving and displaying a communication from the communication server regarding a message directed to the user.

In Example 52, any one of Examples 49-51 may optionally include means for receiving, from the communication server, a user identifier associated with a user other than the user and a request to determine if the user associated with the user identifier is in proximity of the computing device; means for determining whether the user associated with the user identifier is in proximity of the computing device; and means for sending, to the communication server, the result of the determination whether the user associated with the user identifier is in proximity of the computing device.

Example 53 may include a computer-readable medium storing control logic configured to instruct a processor of a computing device to: detect that a user of the computing device is in proximity of the computing device, and send user proximity information regarding the user to a communication server; determine that loss of capability to track the user may be imminent, and send a tracking loss warning to the communication server; detect that one or more secondary computing devices are in proximity of the computing device, and send secondary device proximity information to the communication server; and detect that an other user is in proximity of the computing device, and send user proximity information regarding the other user to the communication server.

Example 54 may include the subject matter of Example 53, wherein the detecting that the user is in proximity of the computing device, the determining that loss of capability to track the user may be imminent, the detecting that the one or more secondary computing devices are in proximity of the computing device, and the detecting that an other user is in proximity of the computing device depend upon previously designated preferences of one or more of the user or users of the secondary computing devices.

Example 55 may include the subject matter of Example 53 or Example 54, wherein the secondary computing devices include one or more of personal computing devices of users other than the user or infrastructure devices unassociated with any particular user.

Example 56 may include the subject matter of any one of Examples 53-55, wherein the control logic is further configured to instruct the processor to receive and display a communication from the communication server regarding a message directed to the user.

Example 57 may include the subject matter of any one of Examples 53-56, wherein the control logic is further configured to instruct the processor to: receive, from the communication server, a user identifier associated with a user other than the user and a request to determine if the user associated with the user identifier is in proximity of the computing device; determine whether the user associated with the user identifier is in proximity of the computing device; and send, to the communication server, the result of the determination whether the user associated with the user identifier is in proximity of the computing device.

Example 58 may include a method for tracking communication options, comprising: detecting, by a computing device, that a user of the computing device is in proximity of the computing device, and sending user proximity information regarding the user to a communication server; determining, by the computing device, that loss of capability to track the user may be imminent, and sending a tracking loss warning to the communication server; detecting, by the computing device, that one or more secondary computing devices are in proximity of the computing device, and sending secondary device proximity information to the communication server; and detecting, by the computing device, that an other user is in proximity of the computing device, and sending user proximity information regarding the other user to the communication server.

Example 59 may include the subject matter of Example 58, wherein the detecting that the user is in proximity of the computing device, the determining that loss of capability to track the user may be imminent, the detecting that the one or more secondary computing devices are in proximity of the computing device, and the detecting that an other user is in proximity of the computing device depend upon previously designated preferences of one or more of the user or users of the secondary computing devices.

Example 60 may include the subject matter of Example 58 or Example 59, wherein the secondary computing devices include one or more of personal computing devices of users other than the user or infrastructure devices unassociated with any particular user.

In Example 61, any one of Examples 58-60 may optionally include receiving and displaying, by the computing device, a communication from the communication server regarding a message directed to the user.

In Example 62, any one of Examples 58-61 may optionally include receiving, from the communication server, a user identifier associated with a user other than the user and a request to determine if the user associated with the user identifier is in proximity of the computing device; determining, by the computing device, whether the user associated with the user identifier is in proximity of the computing device; and sending, to the communication server, the result of the determination whether the user associated with the user identifier is in proximity of the computing device.

Example 63 may include at least one machine readable medium comprising a plurality of instructions that in response to being executed on a computing device, cause the computing device to carry out a method according to any one of Examples 58-62.

Example 64 may include an apparatus configured to perform the method of any one of Examples 58-62.

Example 65 may include a computer system to perform the method of any one of Examples 58-62.

Example 66 may include a machine to perform the method of any one of Examples 58-62.

Example 67 may include an apparatus comprising means for performing the method of any one of Examples 58-62.

Example 68 may include a computing device comprising memory and a chipset configured to perform the method of any one of Examples 58-62.

What is claimed is:

1. An apparatus to track communication options to communicate with a user, comprising, a server-based processor and memory arranged to:
   receive, from one or more user devices of a user, user proximity information that indicates whether the user is in proximity of the one or more user devices, tracking loss warnings that indicate that loss of capabilities to track the user by respective user devices may be imminent, and secondary device proximity information that indicates whether the user device is in proximity of one or more secondary devices of other users or of an infrastructure, unassociated with any particular user;
   receive, from the one or more secondary devices of other users or of an infrastructure, unassociated with any particular user, additional user proximity information that indicates whether the user is in proximity of the one or more secondary devices of other users or of an infrastructure, unassociated with any particular user; and
   dynamically determine from one or more of the user proximity information, the tracking loss warnings, the secondary device proximity information, or the additional user proximity information, which of the user devices and secondary devices are in proximity of the user and can receive communications directed to the user.

2. The apparatus of claim 1, wherein receipt of the user proximity information, the tracking loss warnings, the secondary device proximity information, and the additional user proximity information depend upon previously designated preferences of one or more of the user or users of the secondary devices.

3. The apparatus of claim 1, wherein the processor and memory are further arranged to:
   dynamically determine and maintain a prioritized list of which of the user devices and secondary devices are in proximity of the user and can receive communications directed to the user.

4. The apparatus of claim 1, wherein the secondary devices include infrastructure devices unassociated with any particular user.

5. The apparatus of claim 1, wherein the processor and memory are further arranged to:
   receive, from a third party device, a message directed to the user; and
   send a communication regarding the message to one or more of the one or more user devices, the one or more secondary devices, or one or more communication devices associated with the one or more secondary devices, that have been determined to be in proximity of the user.

6. The apparatus of claim 5, wherein the processor and memory are further arranged to:
   send the communication to the one or more communication devices associated with the one or more secondary devices.

7. The apparatus of claim 5, wherein the processor and memory are further arranged to:
   send the communication to include a request for the user to contact a service associated with the server;
   receive a request for the message from the user; and
   deliver the message to the user.

8. The apparatus of claim 5, wherein the processor and memory are further arranged to:
send the communication based on previously designated conditions of one or more of the user or users of the secondary devices.

9. The apparatus of claim 8, wherein the conditions include at least one of:
what user devices may be used for delivering communications,
what secondary devices may be used for delivering communications,
conditions related to urgency of the message,
conditions related to time of day,
conditions related to day of week,
conditions related to location of the user, and
conditions related to an identity of a person leaving the message.

10. The apparatus of claim 5, wherein the processor and memory are further arranged to:
send a message to the third party device indicating that the user cannot presently be contacted, if the user cannot presently be contacted via one or more user devices or secondary devices.

11. The apparatus of claim 5, wherein the processor and memory are further arranged to:
send, to one or more of the secondary devices, a user identifier and a request to determine whether the user is in proximity of the respective secondary device, if the user cannot presently be contacted; and
send a communication regarding the message to one or more of the one or more secondary devices or communication devices associated with the one or more secondary devices that are in proximity of the user, if a response is received from one or more of the secondary devices that indicates that the user is in proximity.

12. A method, comprising:
receiving, from one or more user devices of a user, user proximity information that indicates whether the user is in proximity of the one or more user devices, tracking loss warnings that indicate that loss of capabilities to track the user by respective user devices may be imminent, and secondary device proximity information that indicates whether the user device is in proximity of one or more secondary devices of other users or of an infrastructure, unassociated with any particular user;
receiving, from the one or more secondary devices of other users or of an infrastructure, unassociated with any particular user, additional user proximity information that indicates whether the user is in proximity of the one or more secondary devices of other users or of an infrastructure, unassociated with any particular user; and
dynamically determining from one or more of the user proximity information, the tracking loss warnings, the secondary device proximity information, or the additional user proximity information, which of the user devices and secondary devices are in proximity of the user and can receive communications directed to the user.

13. The method of claim 12, wherein the secondary devices include infrastructure devices unassociated with any particular user.

14. The method of claim 12, further comprising:
receiving, from a third party device, a message directed to the user; and
sending a communication regarding the message to one or more of the one or more user devices, the one or more secondary devices, or one or more communication devices associated with the one or more secondary devices, that have been determined to be in proximity of the user.

15. The method of claim 14, further comprising:
sending, to one or more of the secondary devices, a user identifier and a request to determine if the user is in proximity of the respective secondary device, if the user cannot presently be contacted; and
sending a communication regarding the message to one or more of the one or more secondary devices or one or more communication devices associated with the one or more secondary devices that are in proximity of the user, if a response is received from one or more of the secondary devices that indicates that the user is in proximity.

16. A non-transitory computer readable medium encoded with a computer program that includes instructions to cause a processor to:
receive, from one or more user devices of a user, user proximity information that indicates whether the user is in proximity of the one or more user devices, tracking loss warnings that indicate that loss of capabilities to track the user by respective user devices may be imminent, and secondary device proximity information that indicates whether the user device is in proximity of one or more secondary devices of other users or of an infrastructure, unassociated with any particular user;
receive, from the one or more secondary devices of other users or of an infrastructure, unassociated with any particular user, additional user proximity information that indicates whether the user is in proximity of the one or more secondary devices of other users or of an infrastructure, unassociated with any particular user; and
dynamically determine from one or more of the user proximity information, the tracking loss warnings, the secondary device proximity information, or the additional user proximity information, which of the user devices and secondary devices are in proximity of the user and can receive communications directed to the user.

17. The non-transitory computer readable medium of claim 16, wherein the secondary devices include infrastructure devices unassociated with any particular user.

18. The non-transitory computer readable medium of claim 16, further including instructions to cause the processor to:
receive, from a third party device, a message directed to the user; and
send a communication regarding the message to one or more of the one or more user devices, the one or more secondary devices, or one or more communication devices associated with the one or more secondary devices, that have been determined to be in proximity of the user.

19. The non-transitory computer readable medium of claim 16, further including instructions to cause the processor to:
send the communication based on previously designated conditions of one or more of the user or users of the secondary devices.

20. The non-transitory computer readable medium of claim 16, further including instructions to cause the processor to:
- send, to one or more of the secondary devices, a user identifier and a request to determine whether the user is in proximity of the respective secondary device, if the user cannot presently be contacted; and
- send a communication regarding a message to one or more of the one or more secondary devices or communication devices associated with the one or more secondary devices that are in proximity of the user, if a response is received from one or more of the secondary devices that indicates that the user is in proximity.

\* \* \* \* \*